United States Patent
Campos

(10) Patent No.: US 8,325,748 B2
(45) Date of Patent: Dec. 4, 2012

(54) FAST VECTOR QUANTIZATION WITH TOPOLOGY LEARNING

(75) Inventor: Marcos M. Campos, Burlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1313 days.

(21) Appl. No.: 11/519,781

(22) Filed: Sep. 13, 2006

(65) Prior Publication Data

US 2007/0064627 A1   Mar. 22, 2007

Related U.S. Application Data

(60) Provisional application No. 60/717,204, filed on Sep. 16, 2005.

(51) Int. Cl.
*H04L 12/28* (2006.01)
*H04L 12/56* (2006.01)
*G06F 7/00* (2006.01)
*G06F 17/30* (2006.01)

(52) U.S. Cl. ........ 370/411; 370/539; 370/541; 345/420; 382/240; 707/736; 707/737; 707/776

(58) Field of Classification Search .................. 370/411, 370/539, 541; 345/420; 382/240; 717/132, 717/133; 707/736, 737, 776
See application file for complete search history.

(56) References Cited

U.S. PATENT DOCUMENTS

| | | | | |
|---|---|---|---|---|
| 5,500,907 A * | 3/1996 | Kunitake et al. | ............... | 382/240 |
| 5,734,791 A * | 3/1998 | Acero et al. | ................... | 704/222 |
| 5,799,110 A * | 8/1998 | Israelsen et al. | ............... | 382/253 |
| 5,809,490 A * | 9/1998 | Guiver et al. | ................... | 706/16 |
| 6,205,256 B1 * | 3/2001 | Chaddha | ........................ | 382/253 |
| 6,226,408 B1 * | 5/2001 | Sirosh | ............................ | 382/224 |
| 6,421,467 B1 * | 7/2002 | Mitra | ............................ | 382/240 |
| 6,516,297 B1 * | 2/2003 | Servetto et al. | ............... | 704/222 |
| 6,671,416 B2 * | 12/2003 | Vishwanath et al. | ......... | 382/253 |
| 2007/0036434 A1* | 2/2007 | Saveliev | ........................ | 382/173 |
| 2007/0064627 A1* | 3/2007 | Campos | ........................ | 370/255 |

OTHER PUBLICATIONS

"S-Tree: self-organizing trees for data clustering and online vector quantization"; Campos, M., Carpenter, G.; Neural Networks, vol. 14, Issue 4-5, pp. 505-525; May 2001.*

* cited by examiner

*Primary Examiner* — Hoon J Chung
*Assistant Examiner* — Benjamin H Elliott, IV
(74) *Attorney, Agent, or Firm* — Murphy & King, P.C.

(57) ABSTRACT

A new process called a vector approximation graph (VA-graph) leverages a tree based vector quantizer to quickly learn the topological structure of the data. It then uses the learned topology to enhance the performance of the vector quantizer. A method for analyzing data comprises receiving data, partitioning the data and generating a tree based on the partitions, learning a topology of a distribution of the data, and finding a best matching unit in the data using the learned topology.

36 Claims, 12 Drawing Sheets

FAST VECTOR QUANTIZATION WITH TOPOLOGY LEARNING

CROSS-REFERENCE TO RELATED APPLICATIONS

The benefit under 35 U.S.C. §119(e) of provisional application 60/717,204, filed Sep. 16, 2005, is hereby claimed.

BACKGROUND OF THE INVENTION

1. Field of the Invention

The present invention relates to providing an implementation of fast vector quantization with topology learning.

2. Description of the Related Art

The problem of topology learning can be defined as: given some high-dimensional data distribution, find a topological structure that closely captures the topology of the data distribution. This problem is closely related to the problem of learning a graph that captures the topological relationships in the data. The goal in topology learning contrasts with that of methods such as Self-Organizing Map (SOM), Growing Cell Structure, Growing Hierarchical Self-Organizing Map, and ISOMAP where the topology of the output space is fixed beforehand. These other methods are mainly concerned with dimensionality reduction. The mappings from the original space to the new space produced by projection methods frequently have topological defects. That is, neighboring points in input spaces may be mapped to far away points in the output or transformed space. Projection methods, however, are especially useful for representing multidimensional data in a form that can be visually inspected.

Learning a topological representation (graph) of a dataset can be used for vector quantization, clustering, link analysis, and indexing for nearest-neighbor and approximate nearest-neighbor searches. Several processes have been proposed for learning general topologies. These can be broadly classified into static (e.g., Neural Gas (NG), and Optimally Topology Preserving Maps (OTPMS)) and constructive architectures (e.g., Growing Neural Gas (GNG), and SAM-SOM). These processes can be seen as attempts to overcome the limitations in the SOM process, including: fixed pre-defined output space topology (SOM uses a regular grid), poor scalability for large topologies, slow learning, and hard to tune parameters. All these methods create topological structures that are more flexible than SOM and thus better capture the topological relationships in the input data distribution. Constructive approaches speed up learning by leveraging hierarchical structures and growing the structure on demand. While most constructive methods use specialized data structures for speeding up learning, SAM-SOM proposes a different approach. It takes advantage of off-the-shelve hierarchical indexing methods to scale to large datasets and number of dimensions. This innovative proposal eliminates the need to develop specialized data structures for speeding up the search for the best matching unit (BMU), a key operation in topology learning processes. Topology-learning processes usually attempt to learn the topology online. As a result, these processes require slow adaptation to the data. With few exceptions (e.g., GNG and SAMSOM), online learning processes use multiple decaying parameters, which lead to relatively slow training. SAM-SOM is the only process that attempts to learn a topological structure with a node for each input data vector. The process use simple rules for creating and pruning connections. It is not clear, however, that these simple rules can approximate well the topology of input data distributions with uneven density and different dimensionalities in different areas of the input space.

Vector quantization is a lossy compression technique that uses a codebook for encoding and decoding data. Vector quantization techniques are aimed at creating small codebooks capable of encoding and decoding data with the smallest possible difference between original and reconstructed data. Vector quantization can also be seen as a special case of clustering. As in clustering, many data records are mapped to a single codevector or cluster. Some applications of vector quantization include speech and image compression. Vector quantizers for high dimensional vector spaces need a large codebook to achieve a small error rate. The Tree-Structured Vector Quantizer (TSVQ) is a popular technique that scales well for large datasets and codebook sizes. Different versions of k-d trees have also been proposed for fast vector quantization. Trees such as k-d trees produce encoders with smaller memory footprint and faster encoding than TSVQ but, in general, they require larger codebooks for achieving the same level of compression of TSVQ.

As the size of the tree (codebook) grows the ability of approaches such as TSVQ and k-d trees to return the actual nearest neighbor to an input vector decreases. That is, the closest codevector (leaf centroid) to a given input may not be the one where the input is mapped to by the tree. The problem becomes more accentuated in axis-parallel approaches like k-d tree, where the partition imposed by the tree at each point is not well aligned with the data distribution principal directions. In general, tree-structured approaches trade speed for higher quantization error for a fixed codebook size when compared with full search approaches such as the LBG process. Some approaches have tried to minimize the impact of the error in the tree assignments by searching multiple paths at the same time or by exploring a learned topological structure to search near-nodes for a better match. Arya and Mount have shown that the latter requires significantly less computation than the standard k-d tree approach for achieving the same level of error. Unfortunately, for a dataset with N input vectors, the RNG* process used in Arya and Mount scales with $O(N^2)$, making it unsuitable for large datasets.

A need arises for a technique for performing vector quantization and topology learning that provides improved performance and implementation compared to previous techniques.

SUMMARY OF THE INVENTION

The present invention provides a new process called a vector approximation graph (VA-graph) that leverages a tree based vector quantizer to quickly learn the topological structure of the data. It then uses the learned topology to enhance the performance of the vector quantizer. The present invention provides improved performance and implementation over previous techniques. VA-graph can also learn graphs with as many nodes as the number of input vectors. The process may be used to improve the performance of any tree based vector quantizer. Alternatively, it could also be used to improve the performance of other structurally constrained vector quantizers (e.g., lattice vector quantizers). For example, the process may first learn a vector quantizer and then the topology. Alternatively, it is also possible to learn both simultaneously. The process may also be extended to work in an online mode.

In one embodiment of the present invention, a method for analyzing data comprises receiving data, partitioning the data and generating a tree based on the partitions, learning a topology of a distribution of the data, and finding a best matching unit in the data using the learned topology.

In one aspect of the present invention, the data may be partitioned by initializing a root node having a centroid equal to a mean of the data and having one leaf, and recursively performing the steps of determining whether the number of leaves of a node is smaller than a desired codebook size, if the number of leaves of a node is smaller than a desired codebook size, attempting to select an eligible leaf node having a largest cost measure value, wherein an eligible leaf node is a leaf node having at least a minimum number of assigned data vectors, if an eligible leaf node is selected, splitting the eligible leaf node. The eligible leaf node may be split by using a 2-means approach for computing centroids of two child nodes into which the eligible leaf node is split and for assigning data to the child nodes. The eligible leaf node may be split by using a mean value of a component of the eligible leaf node having a largest variance to split the eligible leaf node using an axis parallel split. The cost measure value may be determined using a mean quantization error associated with the eligible leaf node or using a number of input vectors assigned to the eligible leaf node.

In one aspect of the present invention, the topology of the distribution of the data may be learned by creating a baseline graph of the tree. The baseline graph of the tree may be created by identifying a level of quantization in a tree structure quantizer, and applying OTPMS to nodes quantized by the tree structure quantizer to construct a baseline graph. The level of quantization in a tree structure quantizer may be identified by selecting all nodes in the tree for which $C_j < n$ and $C_{d(j)} \geq n$, wherein $C_j$ is a number of inputs assigned to node j, d(j) is one index of two children of node j, and n is a user defined parameter.

In one aspect of the present invention, the topology of the distribution of the data may be learned by further linking a subtree based on the baseline graph, and creating long-range links between nodes of the subtree The subtree may be linked based on the baseline graph by generating at least one random vector for each node in the baseline graph, combining the generated random vectors for each node with centroid values of leaf nodes in the subtree to form a combined set, finding and linking leaf nodes in the subtree for each row in the combined set, and assigning a weight to each link. Components of each random vector may be between a minimum and a maximum of values of components of the leaf nodes in the subtree rooted at a respective baseline graph node. The weight assigned to each link is 1/dist(s1, s2), wherein dist(a, b) may be a distance function. The distance function may be a Euclidean metric. The long-range links may be created by for each pair of nodes (u1, u2) connected by a link in the baseline graph and for each leaf s1 in the subtree rooted in u1, finding a closest leaf node s2 in the subtree rooted in u2, creating a link between s1 and s2, if 1/dist(s1, s2) is greater than a smallest weight amongst links containing either s1 or s2, and keeping the link with the smallest weight, if s2 was already linked to a node in the subtree rooted at u1.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

The present invention involves a new process called a vector approximation graph (VA-graph) that leverages a tree based vector quantizer to quickly learn the topological structure of the data. It then uses the learned topology to enhance the performance of the vector quantizer. VA-graph can also learn graphs with as many nodes as the number of input vectors. Although the described example of the process is a batch version, other implementations, such as continuous processing or real-time processing are contemplated by the present invention.

Figure 1:
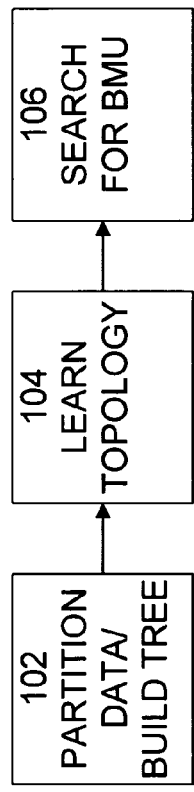
FIG. 1 is an exemplary flow diagram of a process of VA-graph generation.

VA-graph combines a tree-structured vector quantizer with a fast topology-learning process that relies on the tree-structured quantizer for its speed and scalability. The vector quantizer leverages the learned topology of the input data to achieve improved accuracy. The process has three main pieces: tree construction, topology learning, and search or encoding. An example of a process 100 for VA-graph generation is shown in FIG. 1. Process 100 begins with step 102, in which the input data is partitioned and a tree is based on the partitions. In step 104, the topology of the input data distribution is learned. In step 106, a search for the BMU in the tree vector quantizer is performed. Once a topology has been learned, in step 104, it can be used to enhance the search for the BMU.

Figure 2:
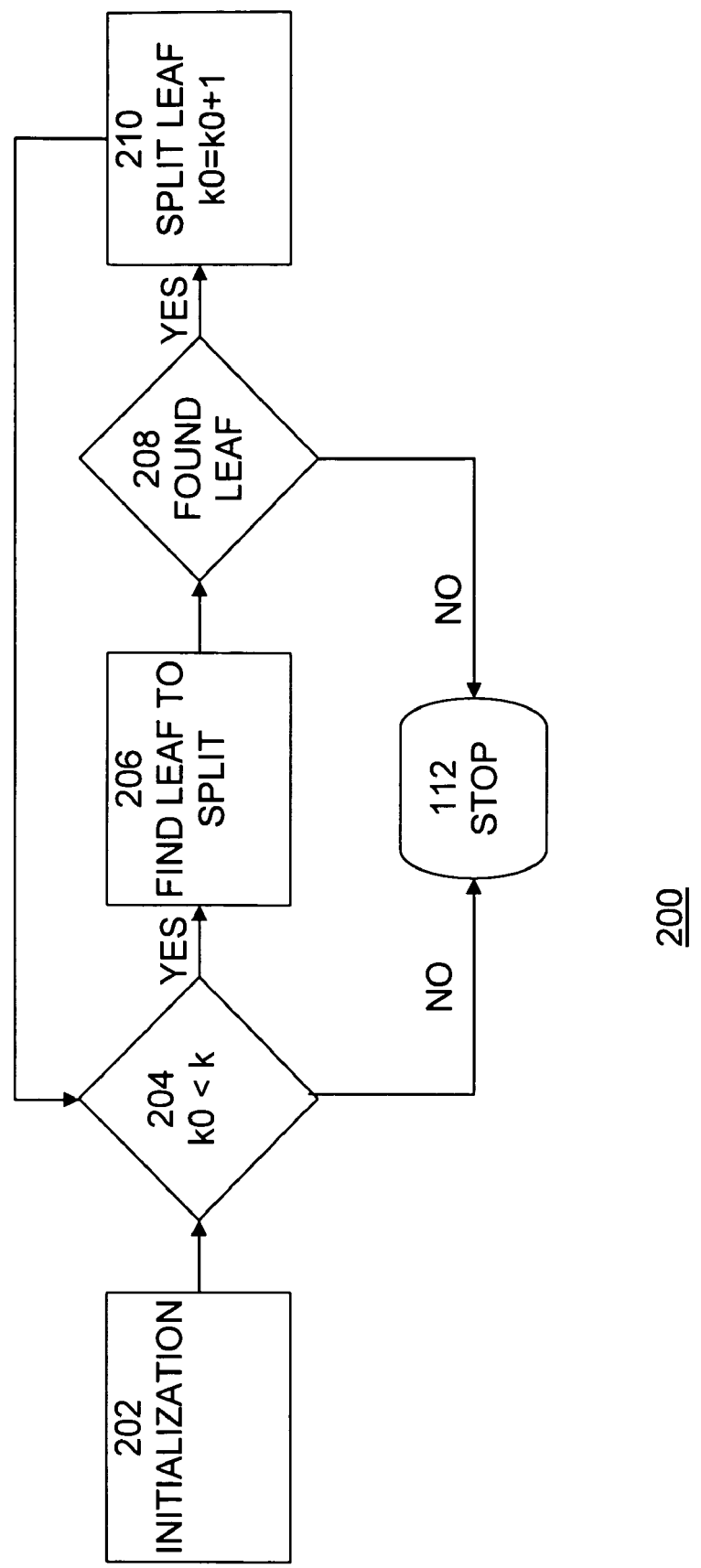
FIG. 2 is exemplary flow diagram of a process of data partitioning shown in FIG. 1.

An example of a process 200 that may be used for performing the data partition step 102 used in VA-graph for constructing the tree is shown in FIG. 2. Process 200 builds a tree recursively, beginning with step 202, in which the process is initialized with a single root node. The centroid of the root node is set to the mean of the data and the number of leaves (k0) is set to 1. In step 204, if the number of leaves is smaller than desired codebook size (k) then, in step 206, the eligible leaf node with the largest cost measure value is selected for splitting. Eligible leaf nodes are those with at least n data vectors assigned to them. If no leaf node is eligible for splitting the process terminates. Some common cost measures are: the mean quantization error associated with the node and the number of input vectors assigned to the node. The leaf splitting step varies according to the type of vector quantizer implemented. TSVQ uses a 2-means approach for computing the centroids of the two child nodes and for assigning data to the child nodes. A k-d tree, on the other hand, uses axis parallel splits. In the k-d tree implemented here, the mean value of the node's component with the largest variance is used to split the node. After a leaf is split in step 208, k0 is incremented by one in step 210, and the process repeats from step 204. When, in step 204, k0 is no longer less than k, or in step 208, no leaves are found, then in step 212, the process stops. The tree building process 200 is O(mN log$_2$ k), where N is the number of input vectors, m is the number of dimensions in an input vector, and k is the maximum or desired codebook size (number of leaves in the tree).

Returning to FIG. 1, it is seen that the topological structure of the input data distribution is learned in step 104 of FIG. 1. This step may be performed as a post-processing step to the tree building step 102. One example of a method for learning the topology of the data may be seen as a hierarchical extension of OTPMS. The OTPMS process works as follows: Given a codebook of size k, constructed by a vector quantizer, for each input vector find the two nearest codevectors to the input and link them. OTPMS is optimum with respect to some of the most commonly used measures of topological quality. However, it requires O(Nkm) computations and does not scale well for large codebooks. If k~N, then it requires O(N$^2$m) processing. In order to mitigate this, the present invention uses a hierarchical vector quantizer to help speed up the computation of the 2-NN problem, that is, finding the two nearest codewords for each input vector. Although there are many different and efficient approaches to speed up nearest neighbor queries, one example of an approach that may be used is: For each row go down the tree using at most p paths and then connect the two leaves closest to the input vector. This procedure is O(Nmp log$_2$ k). For k~N it becomes O(Nmp log$_2$ N). A value of p less than 10 seems to work well for reasonably large codebook sizes. In practice, p equal 4 or 5 produced good results for codebook sizes with a couple of thousand codevectors.

Applications such as link analysis and nearest neighbor queries may require the creation of topological structures where k~N. For these cases, there are not enough data per leaf node for OTPMS to capture the structure of the manifold containing the input vectors. This problem is shared by most topology learning processes. In order to address this the present invention may use a strategy based on generating random data constrained to small volumes of the input space following the local shape of the manifold containing the data, and using the topology at higher layers of the tree as a guide for the topology at lower layers. The random sampling is used to learn local relationships in the spirit of OTPMS. If the sample is constrained to the ranges in the centroids of the nodes in the subtree of a given baseline graph node, it is expected that the sampling will be contained on a hyperrectangle with dimensions adapted to the local shape of the manifold containing the data. The use of the topological connections at the higher layers of the tree as guides to the connectivity at lower levels can be seen as a smoothing or regularizing effect that compensates for the small sample size and help learn the overall structure.

Figure 3:
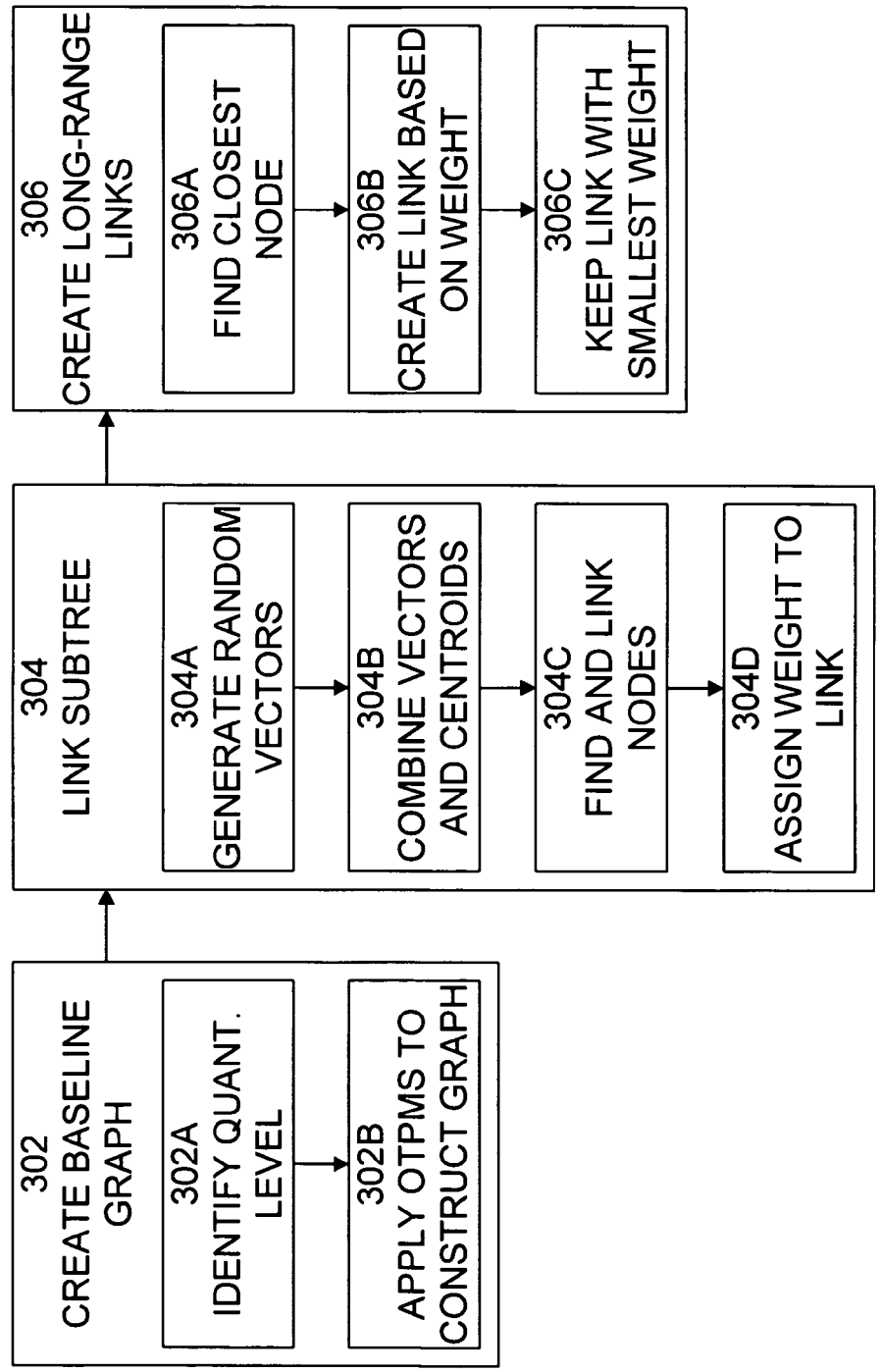
FIG. 3 is an exemplary flow diagram of a process of creation of topological structures.

An example of a process 300 for extending the process of creation of topological structures to cases where k~N is shown in FIG. 3. Process 300 begins with step 302, in which a baseline graph is created. In order to do this, a number of steps are performed. In step 302A, a level of quantization in the tree structure quantizer is identified for which the nodes have enough support to capture well the topology of the data. This can be accomplished by selecting all nodes in the tree where $C_j < n$ and $C_{d(j)} \geq n$, where $C_j$ is the number of inputs assigned to node j, d(j) is one index of two children of node j, and n is a user defined parameter. In step 302B, OTPMS is applied to this set of nodes to construct a baseline graph. The tree structure may be used in order to speed up the 2-NN search. For example, the multi-path approach used along the tree structure is an O(Nmp log$_2$ k$_b$) operation, where k$_b$ is the number of nodes in the baseline graph. This step is quite robust to the value used for the parameter n. For example, a value of n as low as 10 may produce good results.

In step 304, the subtree is linked. In order to do this, a number of steps are performed. In step 304A, for each j node in the baseline graph r random vectors are generated. The components of the random vectors should be between the minimum and the maximum values found for these components in the leaf nodes in the subtree rooted at the respective baseline graph node. In step 304B, the r random vectors are combined with the centroid values for the leaf nodes in the subtree. In step 304C, for each row in the combined set, the 2-NN leaf nodes s1 and s2 in the subtree are found and linked. In step 304D, a weight of 1/dist(s1, s2) is assigned to the link, where dist(a, b) is a distance function (usually the Euclidean metric can be used). This is an O(k$_b$mpr log$_2$ n) operation. For r~n and k$_b$~N/n then it becomes an O(Nmp log$_2$ n) operation.

In step 306, long-range links are created. In order to do this, a number of steps are performed. In step 306A, for each pair of nodes (u1, u2) connected by a link in the baseline graph and for each leaf s1 in the subtree rooted in u1, the closest leaf node s2 in the subtree rooted in u2 is found. In step 306B, if 1/dist(s1, s2) is greater than the smallest weight amongst the links containing either s1 or s2 then a link between s1 and s2 is created. In step 306C, if s2 was already linked to a node in the subtree rooted at u1 then keep the link with the smallest weight. This is an O(0.5k$_b$nmpl log$_2$ n) operation, where l is the average number of links for nodes in the baseline graph. For k$_b$~N/n it becomes O(0.5Nmpl log$_2$ n)

The approach described above takes three parameters: p, n, and r. As an example, setting r=n works well and eliminates the need for a free parameter. However, the present invention is not limited to any particular values of these or other parameters. Rather the present invention contemplates use with any values of these and other parameters.

Figure 4:
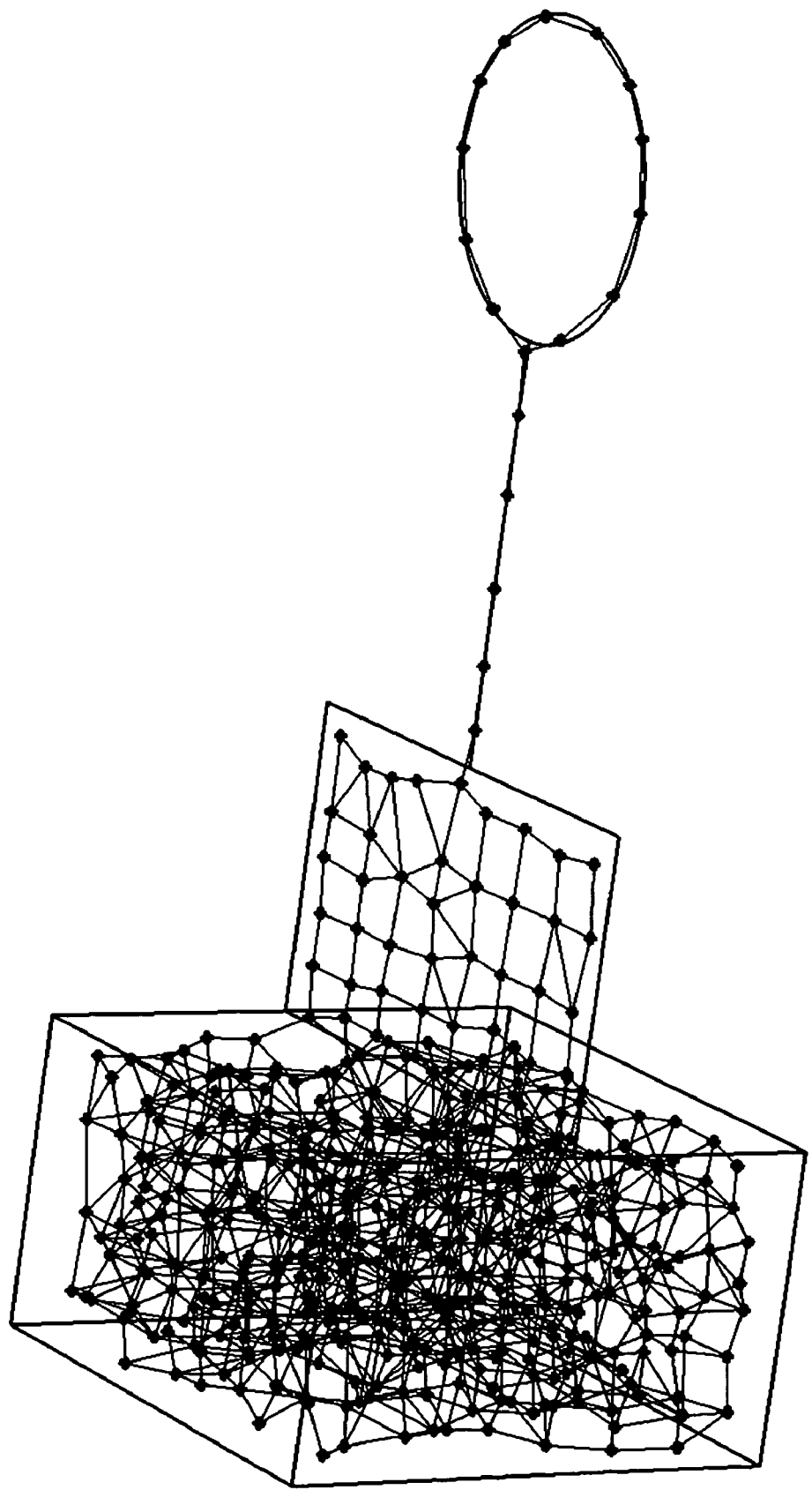
FIG. 4 is an exemplary diagram illustrating the ability of VA-graph to learn the topology of an input distribution.
Figure 5:
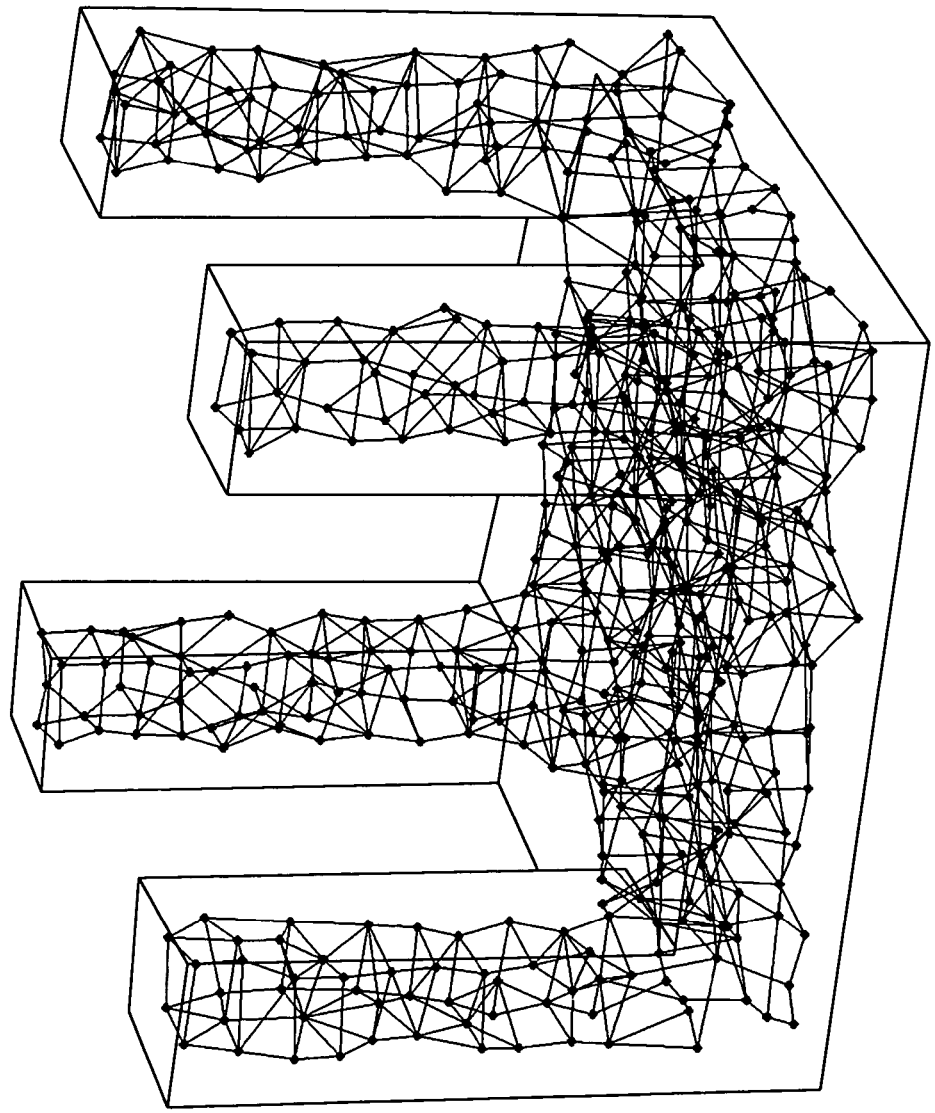
FIG. 5 is an exemplary diagram illustrating the ability of VA-graph to learn the topology of an input distribution.
Figure 6:
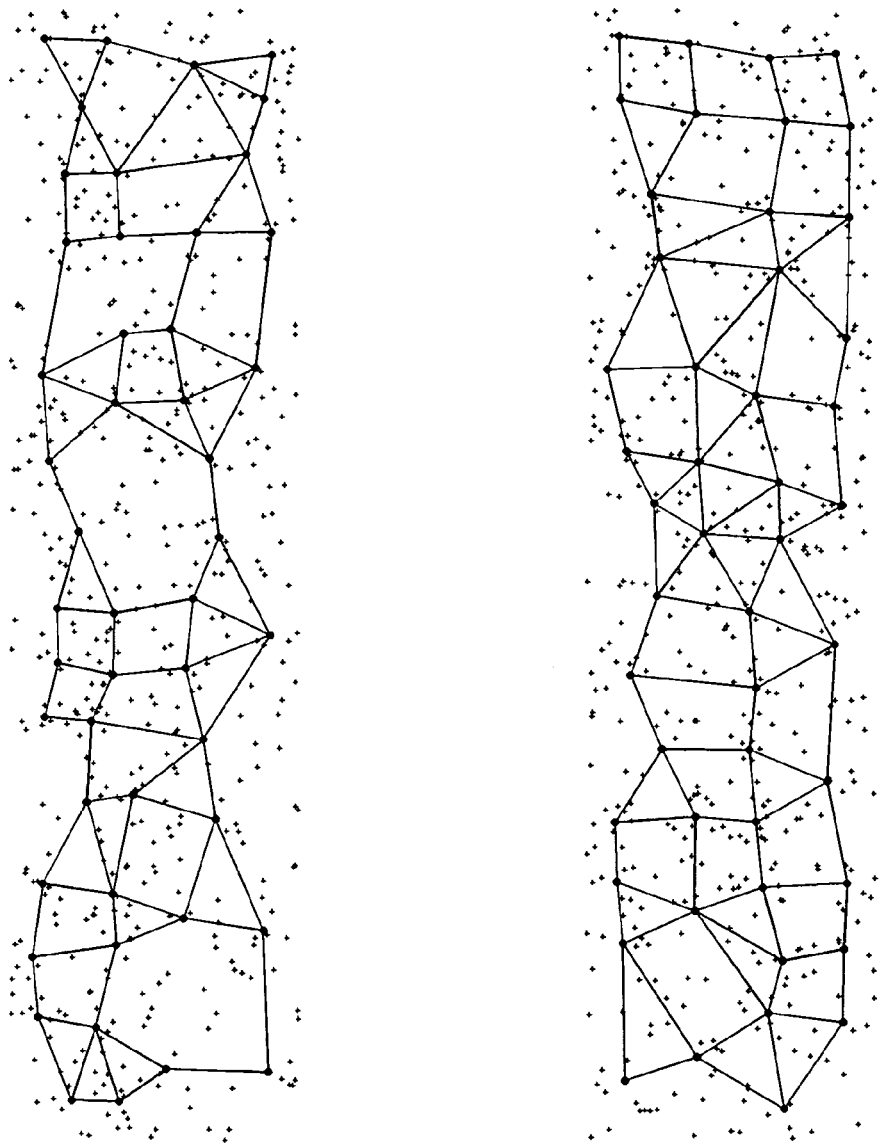
FIG. 6 is an exemplary diagram illustrating the ability of VA-graph to learn the topology of an input distribution.
Figure 7:
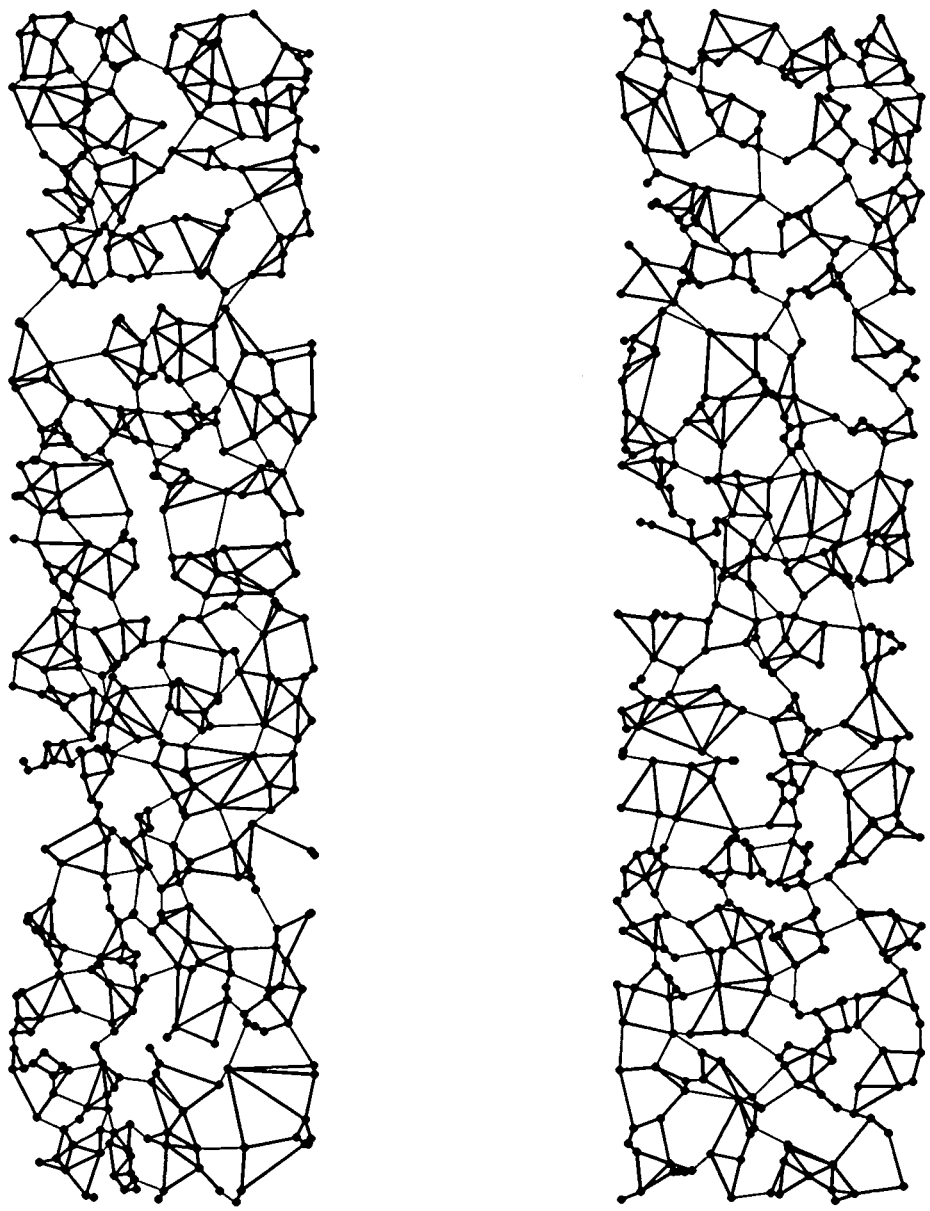
FIG. 7 is an exemplary diagram illustrating the ability of VA-graph to learn the topology of an input distribution.

An example of the ability of VA-graph to learn the topology of the input distribution using the process described above is illustrated in FIGS. 4-7. The k-d tree was the vector quantizer used in these examples. FIGS. 4 and 5 show, for k<<N, how the process can learn a topological structure even when the dimensionality of the data distribution varies in different areas of the input space. FIG. 4 shows how the VA-graph adapts to an exemplary input distribution with different dimensionalities in different areas of the input space, $\epsilon = 0.004$. FIG. 5 shows a final topology configuration for another exemplary 3D dimensional distribution, $\epsilon = 0.007$. The quality of the graph learned by VA-graph was assessed using Kiviluoto's topographic error:

$$\varepsilon = \frac{1}{N} \sum_{i=1}^{N} u(x_i),$$

where $u(x_i) = 1$ if the first and second best matching units (codevectors) are not adjacent, otherwise zero. The graphs in FIGS. 4 and 5 had almost no topographic errors. FIGS. 6 and 7 show that VA-graph can construct a reasonable graph containing one leaf node per input vector (k=N) for a relatively sparse sample. FIG. 6 shows an example for an exemplary input distribution with 500 vectors and the baseline graph obtained with n=15. FIG. 7 shows an example of a final graph with one leaf node per input. The thick lines represent the links produced within each major group by the random rows created using the proposed method (r=10). The thin lines are the links created across groups using the links in the baseline graph as guides.

The method described above can be easily extended to learn a hierarchical topological structure. By constraining the links to certain levels of the tree, it is possible to obtain a coarse to fine description of the structure of the data distribution. The weights on the links learned with the above approach can also be used for pruning the graph and for data exploration.

Figure 8:
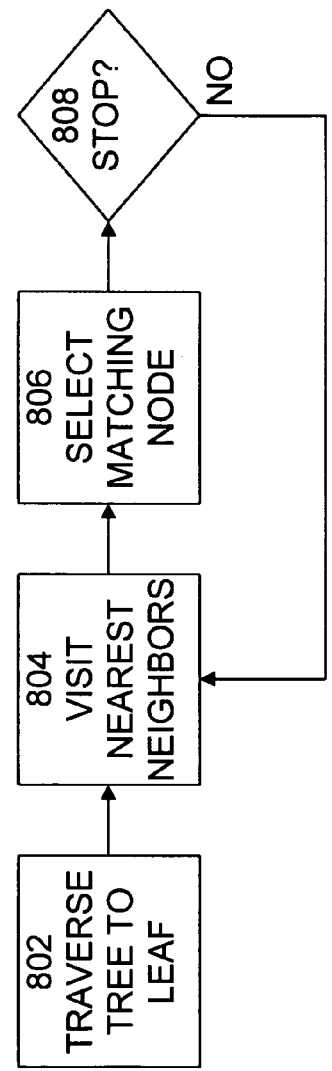
FIG. 8 is an exemplary flow diagram of a process for searching for a BMU in a tree vector quantizer.

Once a topology has been learned it can be used to enhance the search for the BMU in the tree vector quantizer. The search process on the neighborhood graph may be accomplished as shown in FIG. 8. In step 802, the tree is traversed (single path) until a leaf is reached. Next, in step 804 the nearest neighbors in the graph to the leaf node are visited to determined if a better codebook can be found. In step 806, the best matching node is selected for further expansion, in which case its nearest neighbors in the graph are visited. The search through the graph is halted in step 808 after a certain number of nodes have been visited or a given number of expansions s has taken place. The second stopping criterion is the one used in the examples described below. The processing for this approach is $O(Nm \log_2 N+Nms)$ for TSVQ and $O(N \log_2 N+Nms)$ for k-d tree.

Examples of the performance of VA-graph on two vector quantizations are described below. The experiments used the Letters and the Corel Image Features datasets from the UCI Machine Learning Archive and UCI KDD Archive respectively. For all the results below, the following labels were used: k-d tree represents a tree search for a k-d tree quantizer, TSVQ describes a tree search using a TSVQ quantizer, FS indicates a full search over the codebook produced by either tree quantizer (k-d tree or TSVQ), VA-g represents results for a topology learned using the multi-path process described in Section 3 (p=4, n=10, r=0, and s=1), VA-gO indicates results using a topology learned with OTPMS. The full search case (FS) is the smallest quantization error possible for the codebook created by the vector quantizers in the experiments. The topology for the VA-gO results is the optimal topology that can be learned for a particular experiment given the codebook produced by the tree quantizer used in the experiment. The Letters dataset has 20,986 rows and 17 attributes.

Figure 9:
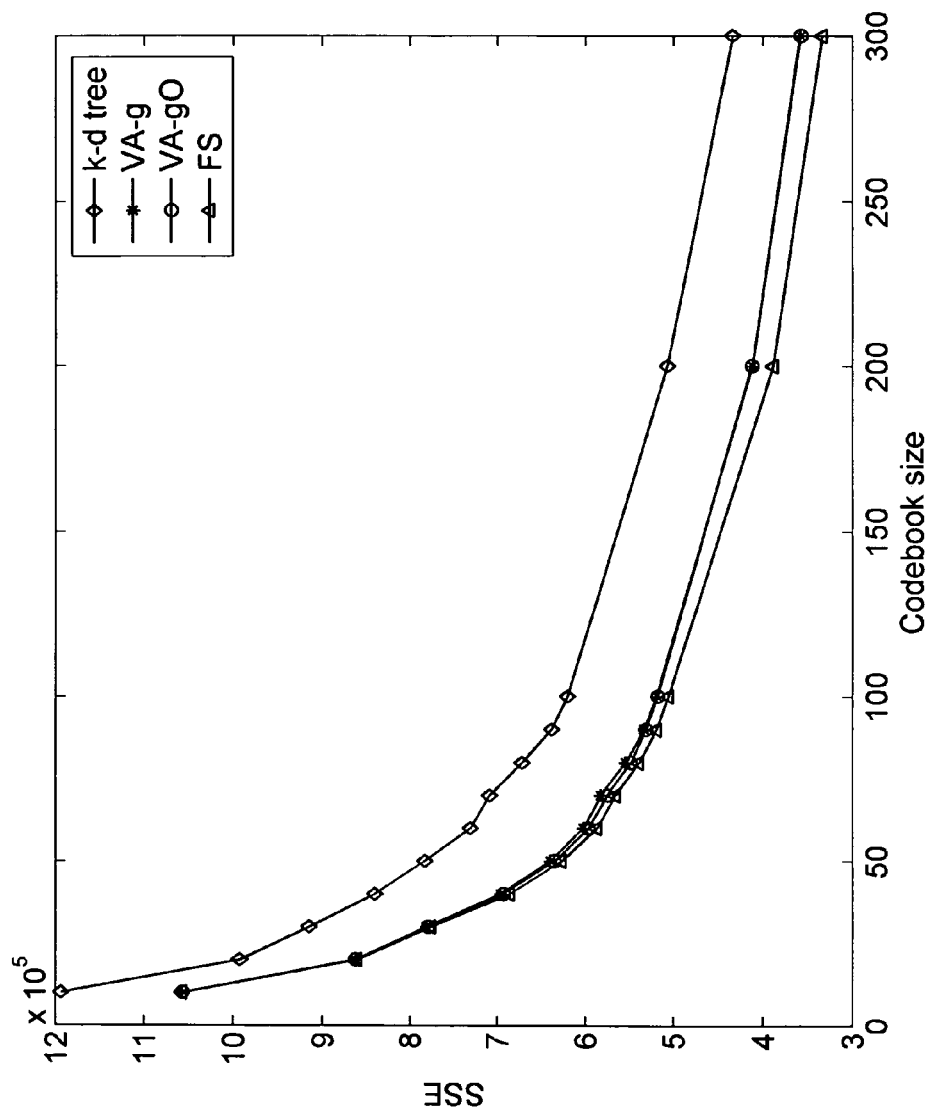
FIG. 9 is an exemplary diagram illustrating the distortion for an exemplary set of studies for different codebook sizes.
Figure 10:
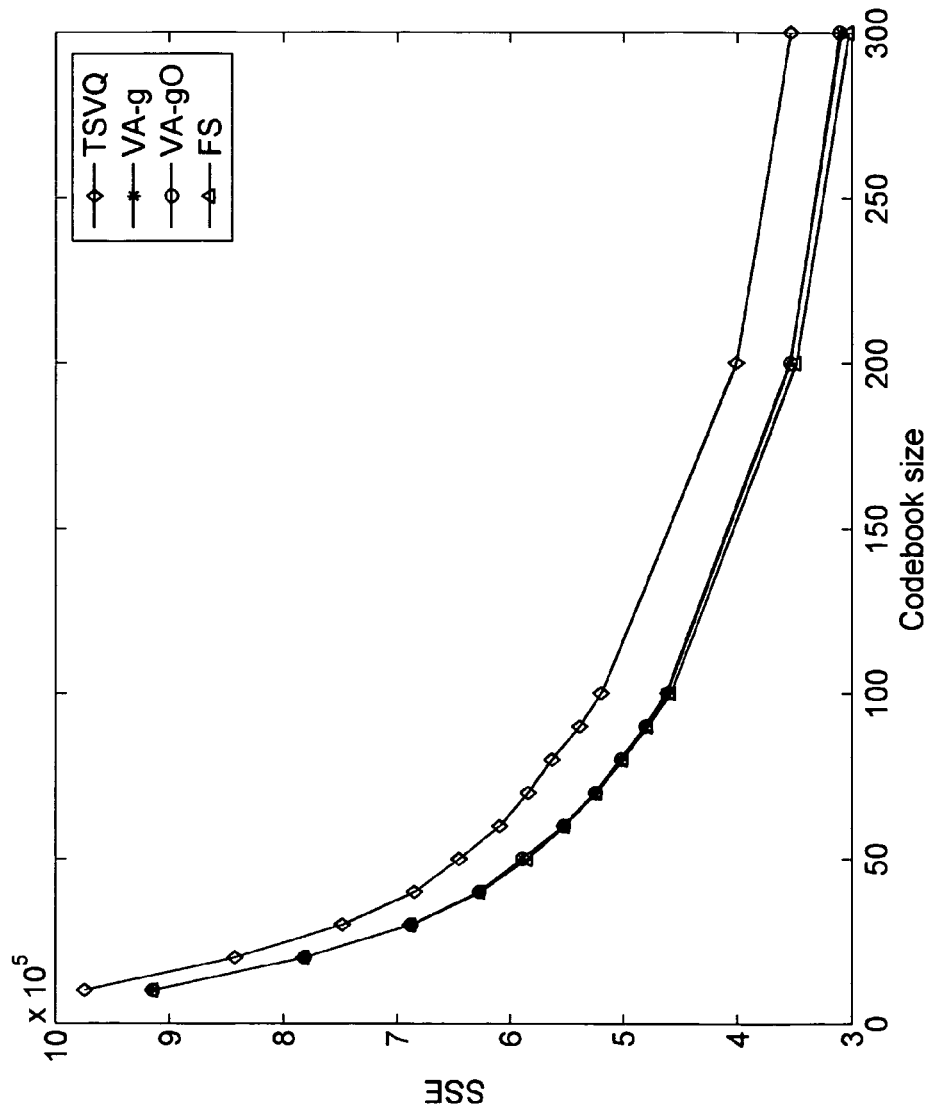
FIG. 10 is an exemplary diagram illustrating the distortion for an exemplary set of studies for different codebook sizes.

FIGS. 9 and 10 show the distortion (SSE, Sum of Squared Errors) for two exemplary sets of studies for different codebook sizes. In the example shown in FIG. 9, a k-d tree was used as the vector quantizer. In the example shown in FIG. 10, TSVQ was used as the vector quantizer. The graphs illustrate the benefit of using VA-graph with the topological information. In this example, the results for the approximated topology using the simple multi-path method are very close to those for the optimal topology. In addition, the performance of the quantizers leveraging the topological structure approaches that of the full search for both the k-d tree and TSVQ even for s=1. Finally, although not shown in the graphs, the average number of extra nodes searched by VA-graph is at most 13 across all codebook sizes and vector quantizers in this set of experiments. To place this in perspective, for a codebook size of 256, VA-graph would search on average $13+\log_2 256=21$ nodes versus 8 nodes for the basic vector quantizers and 256 for the full search case.

Figure 11:
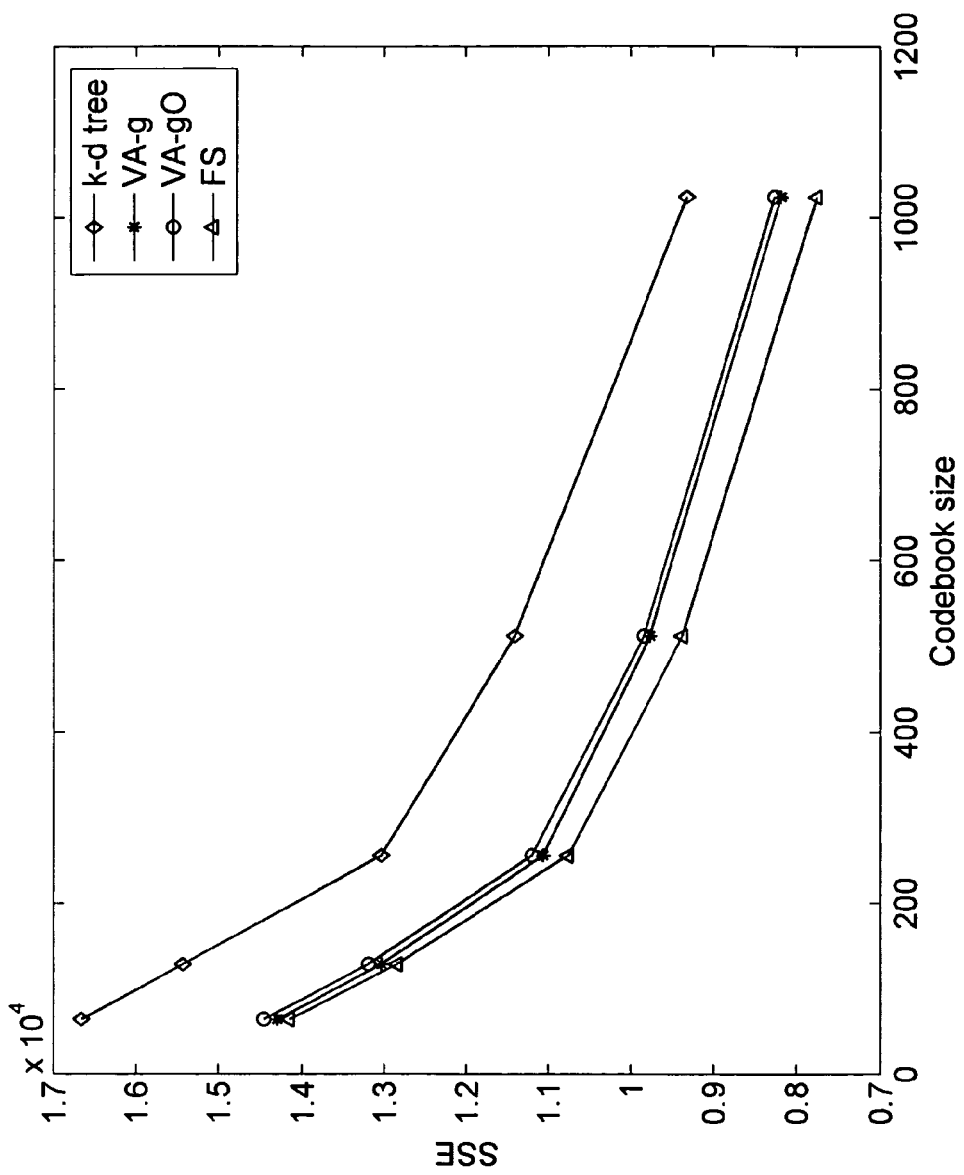
FIG. 11 is an exemplary diagram illustrating the distortion for an exemplary set of studies for different codebook sizes.
Figure 12:
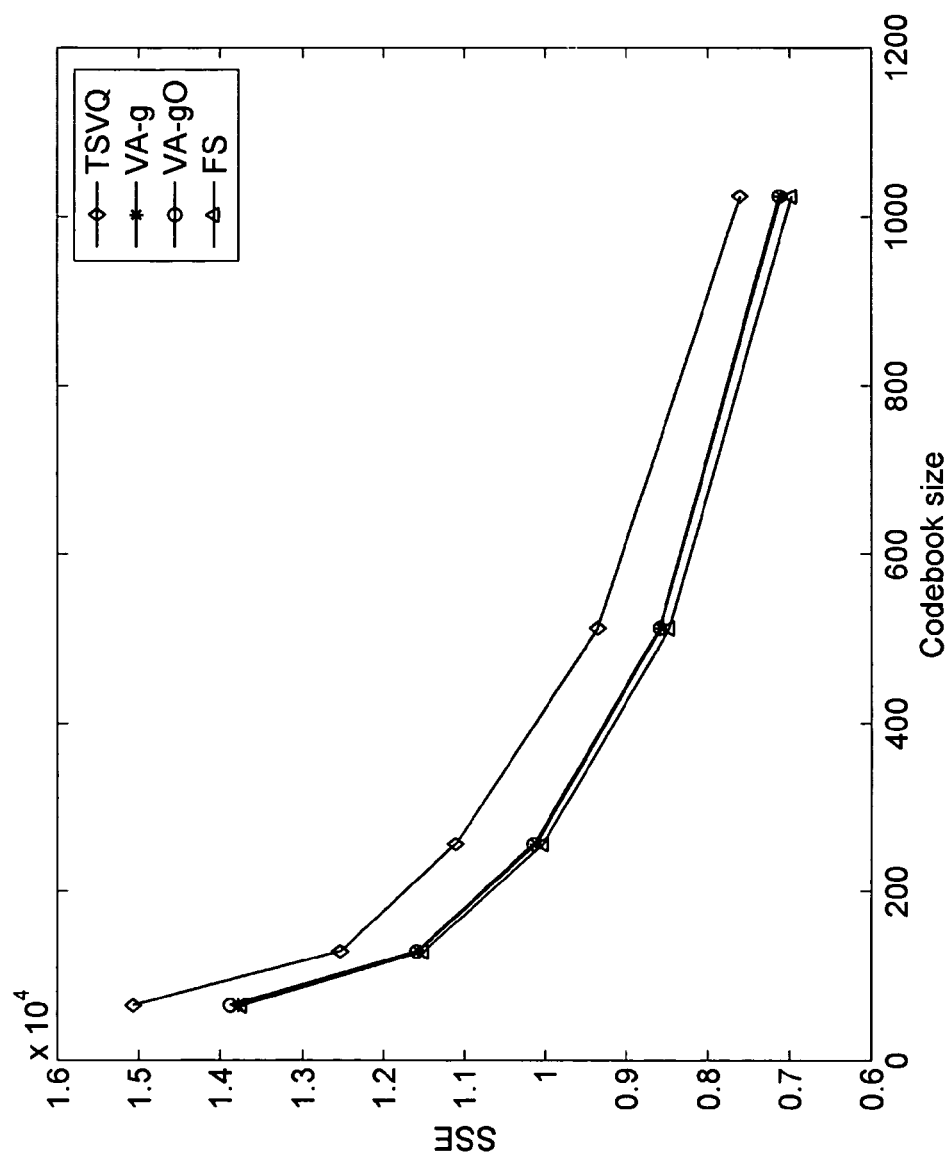
FIG. 12 is an exemplary diagram illustrating the distortion for an exemplary set of studies for different codebook sizes.

For the second example a subset with 20,000 rows and 89 attributes of the Corel dataset was used. The results, illustrated in FIGS. 11 and 12, follow the same trends seen for the Letters dataset. In the example shown in FIG. 11, a k-d tree was used as the vector quantizer. In the example shown in FIG. 12, TSVQ was used as the vector quantizer. Again, the average number of extra nodes searched by VA-graph is at most 13 across all codebook sizes and vector quantizers used with the Corel dataset. Furthermore, for a codebook size of 1024, 97.8% (k-d tree case) and 99.7% (TSVQ case) of the nearest neighbor codevectors were within four hops from the leaf selected by the basic quantizers. For smaller codebook sizes, a higher percentage of the nearest neighbor codevectors were within fewer hops from the initial leaf node.

It should be noted that it is possible to improve the performance of VA-graph by expanding the search in the graph to include more nodes (s>1).

Figure 13:
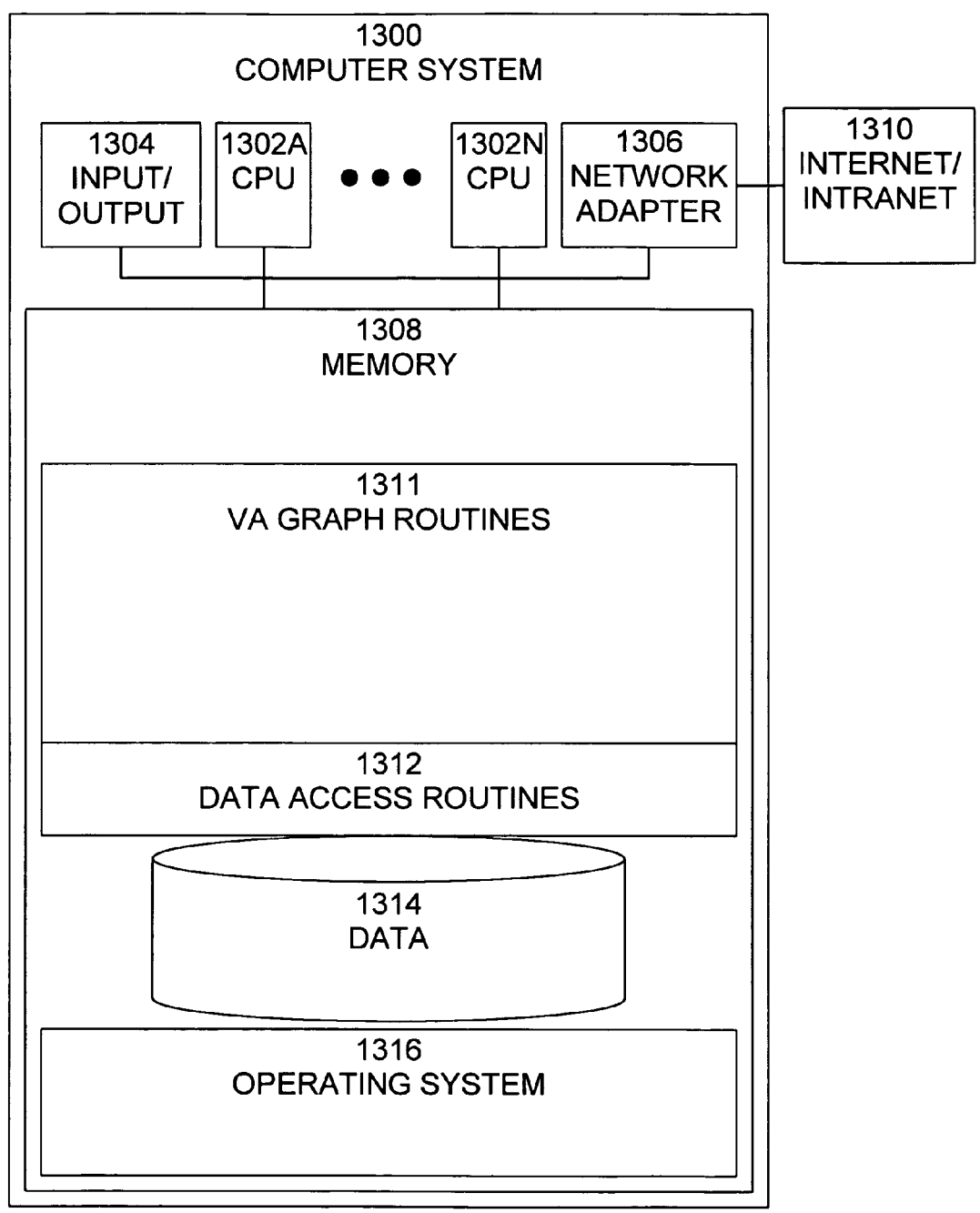
FIG. 13 is an exemplary block diagram of a computer system 1300 in which the present invention may be implemented.

An exemplary block diagram of a computer system 1300 in which the present invention may be implemented, is shown in FIG. 13. Computer system 1300 is typically a programmed general-purpose computer system, such as a personal computer, workstation, server system, and minicomputer or mainframe computer. Computer system 1300 includes one or more processors (CPUs) 1302A-1302N, input/output circuitry 1304, network adapter 1306, and memory 1308. CPUs 1302A-1302N execute program instructions in order to carry out the functions of the present invention. Typically, CPUs 1302A-1302N are one or more microprocessors, such as an INTEL PENTIUM® processor. FIG. 13 illustrates an embodiment in which computer system 1300 is implemented as a single multi-processor computer system, in which multiple processors 1302A-1302N share system resources, such as memory 1308, input/output circuitry 1304, and network adapter 1306. However, the present invention also contemplates embodiments in which computer system 1300 is implemented as a plurality of networked computer systems, which may be single-processor computer systems, multi-processor computer systems, or a mix thereof.

Input/output circuitry 1304 provides the capability to input data to, or output data from, computer system 1300. For example, input/output circuitry may include input devices, such as keyboards, mice, touchpads, trackballs, scanners, etc., output devices, such as video adapters, monitors, printers, etc., and input/output devices, such as, modems, etc. Network adapter 1306 interfaces computer system 1300 with Internet/intranet 1310. Internet/intranet 1310 may include one or more standard local area network (LAN) or wide area network (WAN), such as Ethernet, Token Ring, the Internet, or a private or proprietary LAN/WAN.

Memory 1308 stores program instructions that are executed by, and data that are used and processed by, CPU 1302 to perform the functions of computer system 1300. Memory 1308 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 1308 varies depending upon the functions that computer system 1300 is programmed to perform. One of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 13, memory 1308 includes VA-graph routines 1311, data access routines 1312, data 1314, and operating system 1316. VA-graph routines 1311 provide the capability to generate vector approximation graphs that use a tree based vector quantizer to learn the topological structure of data and then use the learned topology to enhance the performance of the vector quantizer. Data access routines 1312 provide the capability to access data, such as data 1314, in order to retrieve information for processing. Data 1314 includes information that may be stored, organized, modified, and extracted, typically from one or more data tables included in data 1314. Operating system 1316 provides overall system functionality.

One example of a computer system on which the present invention may be implemented is a database management system. However, the present invention contemplates implementation on any type of computer system, whether as part of a database management system, a stand-alone application, or any other type of software implementation.

As shown in FIG. 13, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for analyzing data comprising:
receiving data at a data processing system;
partitioning the data and generating a tree based on the partitions;
learning a topology of a distribution of the data using the generated tree to build a graph of the topology by linking a subtree based on a baseline graph and creating long-range links between nodes of the subtree wherein the long-range links are created by:
for each pair of nodes (u1, u2) connected by a link in the baseline graph and for each leaf s1 in the subtree rooted in u1, finding a closest leaf node s2 in the subtree rooted in u2;
creating a link between s1 and s2, if 1/dist(s1, s2) is greater than a smallest weight amongst links containing either s1 or s2; and
keeping the link with the smallest weight, if s2 was already linked to a node in the subtree rooted at u1; and
finding a best matching unit in the data using the learned topology.

2. The method of claim 1, wherein the data is partitioned by:
initializing a root node having a centroid equal to a mean of the data and having one leaf; and
recursively performing the steps of:
determining whether the number of leaves of a node is smaller than a desired codebook size,
if the number of leaves of a node is smaller than a desired codebook size, attempting to select an eligible leaf node having a largest cost measure value, wherein an eligible leaf node is a leaf node having at least a minimum number of assigned data vectors,
if an eligible leaf node is selected, splitting the eligible leaf node.

3. The method of claim 2, wherein the eligible leaf node is split by using a 2-means approach for computing centroids of two child nodes into which the eligible leaf node is split and for assigning data to the child nodes.

4. The method of claim 2, wherein the eligible leaf node is split by using a mean value of a component of the eligible leaf node having a largest variance to split the eligible leaf node using an axis parallel split.

5. The method of claim 2, wherein the cost measure value is determined using a mean quantization error associated with the eligible leaf node or using a number of input vectors assigned to the eligible leaf node.

6. The method of claim 1, wherein the topology of the distribution of the data is learned by:
creating a baseline graph of the tree.

7. The method of claim 6, wherein the baseline graph of the tree is created by:
identifying a level of quantization in a tree structure quantizer; and
applying Optimally Topology Preserving Maps to nodes quantized by the tree structure quantizer to construct a baseline graph.

8. The method of claim 7, wherein the level of quantization in a tree structure quantizer is identified by:

selecting all nodes in the tree for which $C_j<n$ and $C_{d(j)} \geq n$, wherein $C_j$ is a number of inputs assigned to node j, d(j) is one index of two children of node j, and n is a user defined parameter.

9. The method of claim 1, wherein the subtree is linked based on the baseline graph by:
generating at least one random vector for each node in the baseline graph;
combining the generated random vectors for each node with centroid values of leaf nodes in the subtree to form a combined set;
finding and linking leaf nodes in the subtree for each row in the combined set; and
assigning a weight to each link.

10. The method of claim 9, wherein components of each random vector are between a minimum and a maximum of values of components of the leaf nodes in the subtree rooted at a respective baseline graph node.

11. The method of claim 9, wherein the weight assigned to each link is 1/dist(s1, s2), wherein dist(s1, s2) is a distance function.

12. The method of claim 11, wherein the distance function is a Euclidean metric.

13. A system for analyzing data comprising:
a processor operable to execute computer program instructions;
a memory operable to store computer program instructions executable by the processor; and
computer program instructions stored in the memory and executable to perform the steps of:
receiving data;
partitioning the data and generating a tree based on the partitions;
learning a topology of a distribution of the data using the generated tree to build a graph of the topology by linking a subtree based on a baseline graph and creating long-range links between nodes of the subtree wherein the long-range links are created by:
for each pair of nodes (u1, u2) connected by a link in the baseline graph and for each leaf s1 in the subtree rooted in u1, finding a closest leaf node s2 in the subtree rooted in u2;
creating a link between s1 and s2, if 1/dist(s1, s2) is greater than a smallest weight amongst links containing either s1 or s2; and
keeping the link with the smallest weight, if s2 was already linked to a node in the subtree rooted at u1; and
finding a best matching unit in the data using the learned topology.

14. The system of claim 13, wherein the data is partitioned by:
initializing a root node having a centroid equal to a mean of the data and having one leaf; and
recursively performing the steps of:
determining whether the number of leaves of a node is smaller than a desired codebook size,
if the number of leaves of a node is smaller than a desired codebook size, attempting to select an eligible leaf node having a largest cost measure value, wherein an eligible leaf node is a leaf node having at least a minimum number of assigned data vectors,
if an eligible leaf node is selected, splitting the eligible leaf node.

15. The system of claim 14, wherein the eligible leaf node is split by using a 2-means approach for computing centroids of two child nodes into which the eligible leaf node is split and for assigning data to the child nodes.

16. The system of claim 14, wherein the eligible leaf node is split by using a mean value of a component of the eligible leaf node having a largest variance to split the eligible leaf node using an axis parallel split.

17. The system of claim 13, wherein the cost measure value is determined using a mean quantization error associated with the eligible leaf node or using a number of input vectors assigned to the eligible leaf node.

18. The system of claim 13, wherein the topology of the distribution of the data is learned by:
creating a baseline graph of the tree.

19. The system of claim 18, wherein the baseline graph of the tree
is created by: identifying a level of quantization in a tree structure quantizer; and
applying Optimally Topology Preserving Maps to nodes quantized by the tree structure quantizer to construct a baseline graph.

20. The system of claim 19, wherein the level of quantization in a tree structure quantizer is identified by:
selecting all nodes in the tree for which $C_j<n$ and $C_{d(j)} \geq n$, wherein $C_j$ is a number of inputs assigned to node j, d(j) is one index of two children of node j, and n is a user defined parameter.

21. The system of claim 13, wherein the subtree is linked based on the baseline graph by:
generating at least one random vector for each node in the baseline graph;
combining the generated random vectors for each node with centroid values of leaf nodes in the subtree to form a combined set;
finding and linking leaf nodes in the subtree for each row in the combined set; and
assigning a weight to each link.

22. The system of claim 21, wherein components of each random vector are between a minimum and a maximum of values of components of the leaf nodes in the subtree rooted at a respective baseline graph node.

23. The system of claim 21, wherein the weight assigned to each link is 1/dist(s1, s2), wherein dist(s1, s2) is a distance function.

24. The system of claim 23, wherein the distance function is a Euclidean metric.

25. A computer program product for analyzing data comprising:
a non-transitory computer readable storage medium;
computer program instructions, recorded on the computer readable medium, executable by a processor, for performing the steps of
receiving data;
partitioning the data and generating a tree based on the partitions;
learning a topology of a distribution of the data using the generated tree to build a graph of the topology by linking a subtree based on a baseline graph and creating long-range links between nodes of the subtree wherein the long-range links are created by:
for each pair of nodes (u1, u2) connected by a link in the baseline graph and for each leaf s1 in the subtree rooted in u1, finding a closest leaf node s2 in the subtree rooted in u2;
creating a link between s1 and s2, if 1/dist(s1, s2) is greater than a smallest weight amongst links containing either s1 or s2; and
keeping the link with the smallest weight, if s2 was already linked to a node in the subtree rooted at u1; and finding a best matching unit in the data using the learned topology.

26. The computer program product of claim 25, wherein the data is partitioned by:
    initializing a root node having a centroid equal to a mean of the data and having one leaf; and
    recursively performing the steps of:
        determining whether the number of leaves of a node is smaller than a desired codebook size,
        if the number of leaves of a node is smaller than a desired codebook size, attempting to select an eligible leaf node having a largest cost measure value, wherein an eligible leaf node is a leaf node having at least a minimum number of assigned data vectors,
        if an eligible leaf node is selected, splitting the eligible leaf node.

27. The computer program product of claim 26, wherein the eligible leaf node is split by using a 2-means approach for computing centroids of two child nodes into which the eligible leaf node is split and for assigning data to the child nodes.

28. The computer program product of claim 26, wherein the eligible leaf node is split by using a mean value of a component of the eligible leaf node having a largest variance to split the eligible leaf node using an axis parallel split.

29. The computer program product of claim 26, wherein the cost measure value is determined using a mean quantization error associated with the eligible leaf node or using a number of input vectors assigned to the eligible leaf node.

30. The computer program product of claim 25, wherein the topology of the distribution of the data is learned by:
    creating a baseline graph of the tree.

31. The computer program product of claim 30, wherein the baseline graph of the tree is created by:
    identifying a level of quantization in a tree structure quantizer; and
    applying Optimally Topology Preserving Maps to nodes quantized by the tree structure quantizer to construct a baseline graph.

32. The computer program product of claim 31, wherein the level of quantization in a tree structure quantizer is identified by:
    selecting all nodes in the tree for which $C_j < n$ and $C_{d(j)} \geq n$, wherein $C_j$ is a number of inputs assigned to node j, d(j) is one index of two children of node j, and n is a user defined parameter.

33. The computer program product of claim 25, wherein the subtree is linked based on the baseline graph by:
    generating at least one random vector for each node in the baseline graph;
    combining the generated random vectors for each node with centroid values of leaf nodes in the subtree to form a combined set;
    finding and linking leaf nodes in the subtree for each row in the combined set; and
    assigning a weight to each link.

34. The computer program product of claim 33, wherein components of each random vector are between a minimum and a maximum of values of components of the leaf nodes in the subtree rooted at a respective baseline graph node.

35. The computer program product of claim 33, wherein the weight assigned to each link is 1/dist(s1, s2), wherein dist(s1, s2) is a distance function.

36. The computer program product of claim 35, wherein the distance function is a Euclidean metric.

* * * * *

UNITED STATES PATENT AND TRADEMARK OFFICE
CERTIFICATE OF CORRECTION

PATENT NO. : 8,325,748 B2  
APPLICATION NO. : 11/519781  
DATED : December 4, 2012  
INVENTOR(S) : Campos Page 1 of 1

It is certified that error appears in the above-identified patent and that said Letters Patent is hereby corrected as shown below:

In column 12, line 5, in Claim 17, delete "claim 13," and insert -- claim 14, --, therefor.

Signed and Sealed this
Twelfth Day of March, 2013

Teresa Stanek Rea
*Acting Director of the United States Patent and Trademark Office*